United States Patent [19]

Magnusson

[11] Patent Number: 4,634,084
[45] Date of Patent: Jan. 6, 1987

[54] AIRCRAFT DE-ICING SYSTEM

[75] Inventor: Kjell-Eric Magnusson, Bromma, Sweden

[73] Assignee: De-Icing System K.B., Stockholm, Sweden

[21] Appl. No.: 770,483

[22] Filed: Aug. 29, 1985

[51] Int. Cl.⁴ ............................................. B64D 15/10
[52] U.S. Cl. ............................ 244/134 C; 244/134 R; 244/114 R; 404/31; 404/36
[58] Field of Search ........... 244/134 R, 134 C, 114 R, 244/115, 116; 405/36, 38; 404/31, 36

[56] References Cited

U.S. PATENT DOCUMENTS

| | | | |
|---|---|---|---|
| 3,533,395 | 10/1970 | Yaste | 244/134 C |
| 3,612,075 | 10/1971 | Cook | 244/134 C |
| 3,908,385 | 9/1975 | Daniel et al. | 405/37 |
| 4,348,135 | 9/1982 | St. Clair | 405/36 |

Primary Examiner—Galen Barefoot
Assistant Examiner—Mark R. Valliere
Attorney, Agent, or Firm—Sughrue, Mion, Zinn, Macpeak, and Seas

[57] ABSTRACT

The invention relates to an aircraft de-icing system comprising an aircraft-washing hardstanding (1) onto which an aircraft can be moved, and pipes and nozzles, (3) for spraying de-icing fluid onto the aircraft, and discharge and drainage pipes (15, 16) combined with a sloped impervious layer (11) for collecting and carrying away the fluid.

In order to enable the fluid to be removed from the hardstanding quickly and reliably, the hardstanding is constructed so as to comprise a substantially planar surface layer (12) of so-called drainage asphalt, and an impervious layer (11) which is located beneath the planar surface layer and which slopes steeply down towards drainage pipes (15), so as to collect and carry away the de-icing fluid passing down through the surface layer (12). The system also preferably includes a pump (7) arranged to draw air down through the surface layer so as to entrain therewith any water vapor formed and thus prevent the formation of vapor clouds liable to rise from the hardstanding (1).

3 Claims, 1 Drawing Figure

U.S. Patent  Jan. 6, 1987  4,634,084
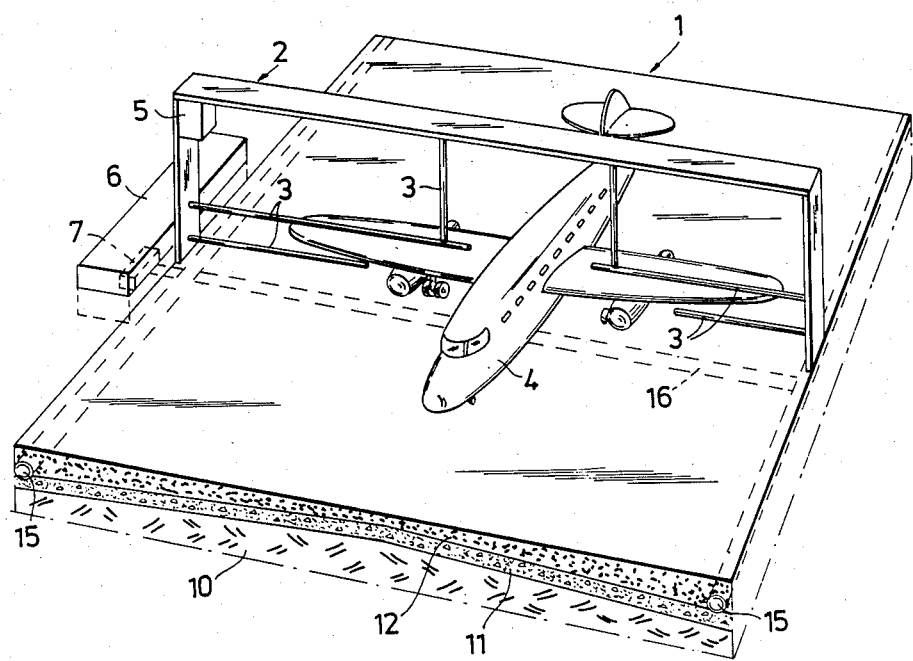

AIRCRAFT DE-ICING SYSTEM

The present invention relates to an aircraft de-icing system of the kind which comprises an aircraft-washing hardstanding which presents an aircraft carriageway; nozzle and pipe structure for showering the aircraft with de-icing fluid; and drainage structure for collecting and carrying away the de-icing fluid.

BACKGROUND OF THE INVENTION

In de-icing systems of this kind, for example the system illustrated and described in Swedish Patent Specification No. 7713619-0, the hardstanding exhibiting the carriageway must be constructed so as to be able to withstand the heavy load exerted by an aircraft, and so as to enable an aircraft to be moved safely into position in the absence of any disturbing irregularities which might cause the wing-tips of the aircraft to swing and be damaged by contact with, for example, washing or swilling devices and the like located in the vicinity of the various aircraft parts.

At the same time, the arrangements used to collect and carry away the large quantities of de-icing fluid; which run down from the aircraft onto the hardstanding area must be highly effective, without presenting too much of an obstacle to smooth forward movement of the aircraft. In addition, it is found that in the majority of weather conditions heavy mists are formed if the used process liquor is not removed and dispensed with quickly enough, such mists being also troublesome to those parts of the airfield located in the vicinity of the de-icing station.

The object of the present invention is to provide a system in which the aforesaid disadvantages are avoided substantially completely, in a simple and inexpensive fashion.

SUMMARY OF THE INVENTION

This object has been achieved in accordance with the invention with the aid of an aircraft-washing hardstanding which comprises a substantially planar surface layer of liquid-permeable road-surfacing material, and an impervious layer which is intended for collecting and carrying away the de-icing fluid and which slopes down towards drainage pipes.

In the case of an hardstanding so constructed the de-icing fluid running down onto the surface layer will pass directly through said surface layer, which can consequently be of planar configuration, since the arrangements and devices for collecting and carrying away the de-icing fluid are located beneath the surface layer.

A hardstanding of this construction also affords the important advantage of enabling the drainage pipes to be connected to a pump arranged to remove water vapor from the liquid-permeable surface layer by suction. In this way water vapor is prevented, to a large extent, from rising up from the aircraft-washing hardstanding and sweeping into the aircraft in the form of a vapor cloud, which is of considerable benefit with respect to process performance and with respect to the general visibility in busy and crowded airfields. The surface layer also serves as a coarse filter, in which leaves, twigs etc. can fasten. The suction pump is therefore suitably adapted for switching to a mode in which air is temporarily blown through the drainage pipes and up through the outer surface, so that any foreign objects present can be blown free from the channels and passageways of the surface layer. Preferably, cold ambient air, or optionally chilled air is blown through said passageways for a suitable length of time immediately prior to commencing a de-icing process, which normally takes about three minutes to complete. This affords the advantage of cooling the surface layer and the drainage and discharge pipes to an extent sufficient to cool the water vapor sucked down through the surface layer over the whole of the de-icing process, so that the water contained in the water vapor condenses prior to the water vapor reaching the pump in the machine room.

BRIEF DESCRIPTION OF THE DRAWING

The invention will now be described in more detail with reference to the accompanying drawing, which illustrates in perspective an embodiment of a de-icing system according to the invention, partly in section.

DESCRIPTION OF THE PREFERRED EMBODIMENT

The drawing illustrates an elongated rectangular aircraft-washing hardstanding 1 which is situated on an airfield, suitably for direct access from the aircraft approach path leading from the airfield buildings to the aircraft runways. The hardstanding 1, has a breadth which is slightly larger than the wing span of the largest aircraft which can be expected for treatment, and extending across the hardstanding is a portal 2 provided with pipes and nozzles 3 so positioned that an aircraft 4 rolling onto the hardstanding 1 is able to pass through the portal with the nozzles located at a pre-determined distance from the various parts of the aircraft, particularly from the upper and lower surfaces of the wings of the aircraft. Located on one side of the portal 2 is a supervising cabin 5. Located adjacent the cabin 5 is a partially submerged machine room 6, to which the pipes 3 provided with the aforesaid spray nozzles extend.

The hardstanding 1 is constructed of three mutually different layers, namely a bottom supporting layer 10, an impervious layer 11 which is located above the support layer 10 and comprises a liquid-impermeable material, such as concrete, and which slopes steeply from both sides of the centre line of the hardstanding 1, and finally a top surface layer 12 which comprises a liquid-permeable material, such as a road surfacing material, for example drainage asphalt, and which has a substantially planar top surface.

The liquid-permeable material is suitably a hot-mixed (150°–170° C.) asphalt concrete having cavities of 15–20% and about about 60% ballast material of largest ballast fraction, and a fibre addition which increases the compression strength of the material and its length of useful life.

Drainage pipes 15 are embedded in the longitudinal edges of the impervious layer 11 around the hardstanding 1, so that all liquid penetrating down through the surface layer 12 and running down along the impervious layer is collected in the drainage pipes 15.

The drainage pipes 15 are connected to the machine room 6 by means of discharge pipes 16. The machine room 5 houses an arrangement of pumps, tanks, filters, valves etc. for pumping under high pressure a water-glycol-mixture of varying concentration to the pipes 3 and the nozzles as the aircraft is slowly moved through the portal 2. All surfaces of the aircraft are contacted by the liquid jets in accordance with a pre-determined program, whereupon ice and snow are loosened and washed from the aircraft and fall onto the hardstanding 1 together with the de-icing fluid, wherewith the fluid and the molten snow and ice quickly pass through the surface layer 12 onto the impervious layer 11 and from there through the drainage pipes 15 and the discharge pipes 16 to the machine room 6, where the fluid is reconditioned and strengthened to the desired concentration for renewed pumping to the pipes 3 and nozzles of the portal 2.

The machine room 6 also houses a large-capacity vacuum pump 7 which is connected to the discharge pipes 16, this vacuum pump being effected to draw a flow of air downwardly through the surface layer 12. Those clouds of water vapor which would otherwise rise up from the hardstanding 1 and which derive from the relatively warm de-icing fluid in cold weather will therewith be drawn through the drainage and discharge pipes 15,16 instead, which is an important sequel of the invention.

The portal 2 need not be an immovable structure, but may be arranged for movement on the longitudinal direction of the hardstanding 1, in which case the aircraft can be allowed to remain stationary during the de-icing process.

I claim:

1. An aircraft de-icing system comprising an aircraft-washing hardstanding (1) for supporting an aircraft and further incorporating a carriageway for an aircraft (4), pipe and nozzle means (3) for washing the aircraft with de-icing fluid, and drainage and discharge means (15, 16) for collecting and carrying away the de-icing fluid, characterized in that the hardstanding (1) comprises a substantially planar surface layer (12) for contact with the aircraft and constructed from a liquid-permeable road-surfacing material, such as so-called drainage asphalt, and an impervious layer (11) under said surface layer which slopes away towards drainage pipes (15), for collecting and carrying away the de-icing fluid.

2. A de-icing system according to claim 1, characterized in that the drainage and discharge means (15) is connected to a pump for removing water vapor from the liquid permeable surface layer (12) by suction.

3. A de-icing system according to claim 2, characterized in that the pump (7) can be switched to a mode in which it temporarily blows air, preferably cold air, through the drainage means (15) and up through the surface layer (12).

* * * * *